Patented Jan. 27, 1925.

1,524,500

UNITED STATES PATENT OFFICE.

FRANK J. BAUMGARDNER, OF CLEVELAND, OHIO, ASSIGNOR OF ONE-HALF TO FRANK L. PHIPPS, OF CLEVELAND, OHIO.

COMPOSITION OF MATTER.

No Drawing.   Application filed November 12, 1917.  Serial No. 201,496.

*To all whom it may concern:*

Be it known that I, FRANK J. BAUM-GARDNER, a citizen of the United States, residing at Cleveland, in the county of Cuyahoga and State of Ohio, have invented certain new and useful Improvements in Compositions of Matter, of which the following is a specification.

My invention relates to a new or improved composition of matter embodying a material which I have discovered may be used as a substitute for and improvement on various extensively employed chemical elements and substances now employed in various commercial products and manufactures.

My invention further relates to what may be termed a "sizing" or "filling" material, the improved material preferably comprising finely divided or pulverized oyster shells which I have discovered may be used as a substitute for and improvement on white lead, zinc oxide, and analogous materials now freuently and extensively employed in commercial "size" in the manufacture of various textiles, paper-making, and the like, and as a "filler" in the vulcanization and manufacture of rubber and various rubber articles of products.

While I prefer to use finely divided or ground oyster shells, under certain circumstances and for certain purposes I may also use the shells of clams, mussels, and the like, of the group of "mollusks" known as "bivalves" so that by the term "mollusk" as hereinafter used I mean to include clams, oysters, and mussels.

I have discovered that finely divided or pulverized uncalcined mollusk shells, and particularly oyster shells, reduced in their natural state or without chemical decomposition,—are admirably adapted as a substitute for and in fact as an improvement on such substances as zinc oxide, white lead, lime, chalk, and the like now extensively employed as "fillers" in the manufacture of various rubber articles. In such connection the term "filler" is a name applied to a great number of substances mixed with rubber for various purposes. For example,—the elasticity of soft rubber goods is often increased by the addition of vermilion and slaked lime, or by admixture with asphaltum or colophony. The resistance to pressure is increased to a more or less degree by the addition to the mixture of zinc oxide, calcined magnesia, asphaltum, or chalk. The mechanical strength of soft rubber is improved by the addition of such mineral substances as magnesia, litharge, chalk, lime, zinc oxide, and in some cases by asphaltum, and glycerine. The insulating properties of pure rubber are not so great as a mixture of rubber and paraffin wax, and the addition to rubber of zinc oxide, lime, magnesia, and white and brown substitutes in comparatively small quantities also improves its dielectric properties. The resistance to acids is increased more or less by the addition of organic compounds. The action of oils upon rubber is lessened by the addition of litharge and zinc oxide to the mixing.

It should be understood that the pulverized uncalcined mollusk, and particularly oyster shells,—may not only be used as a complete substitute for zinc oxide, white lead, and the like, in connection with the various fillers mentioned in the manufacture of rubber and rubber articles, but under certain circumstances may be incorporated with such filler substances in suitable proportions, resulting in the rubber and rubber articles not only being greatly improved in quality, but in being much more economically produced, particularly since the shells mentioned are comparatively inexpensive and are now practically waste material.

As applied to or used in the manufacture of rubber and rubber articles the caoutchouc or native india rubber may be vulcanized in any suitable or conventional manner and the ingredients and substances may be varied in number and proportions in accordance with the requirements to be met in the particular article to be produced.

Practical experiments and tests have shown that rubber and rubber articles resulting from the use of my improved filler in the process of manufacture or of vulcanization are not only generally improved, but their mechanical strength and resistance to the action of oils is greatly increased, it being found that the ingredients or material of the powder or pulverized shells is such as to provide an ideal strengthening or binding agent or medium.

Having thus described my improved com- position or sizing or filling material, without having attempted to set forth all the forms in which it may be made, or all of the modes or applications of its use, what I claim and desire to secure by Letters Patents, is,—

1. A rubber filling material composed of comminuted uncalcined mollusk shells.

2. In a rubber composition, a filling material, composed of pulverized uncalcined oyster shells.

3. A new rubber composition, comprising comminuted uncalcined mollusk shells.

4. A new plastic composition, composed of rubber, sulphur and ground uncalcined mollusk shells.

5. A rubber composition, comprising ground uncalcined mollusk shells and a carrying and binding agent.

6. As a new composition of matter, a rubber product including a filler of ground uncalcined mollusk shells thoroughly incorporated and vulcanized therein.

7. A new rubber composition, including comminuted uncalcined mollusk shells and binding and carrying elements incorporated and vulcanized therein.

8. As a new composition of matter, a rubber filler of finely divided uncalcined mollusk shells, and rubber binding and vulcanizing agents.

9. A plastic composition, comprising caoutchouc, sulphur, and a filler of finely divided uncalcined mollusk shells.

10. A new plastic composition, comprising caoutchouc, and sulphur and ground uncalcined mollusk shells thoroughly incorporated therein, and vulcanized by the application of heat.

11. A new rubber composition, comprising caoutchouc, sulphur and pulverized uncalcined mollusk shells vulcanized by the application of heat.

12. A rubber article having incorporated therein and inseparably mixed in the rubber, finely ground oyster shells reduced without chemical decomposition.

13. As an ingredient of a rubber compound, finely ground oyster shells reduced without chemical decomposition and intimately mixed in the rubber compound.

In testimony whereof I have affixed my signature in the presence of two witnesses.

FRANK J. BAUMGARDNER.

Witnesses:
O. C. BILLMAN,
F. L. PHIPPS.